US008115878B2

(12) United States Patent
Chung et al.

(10) Patent No.: US 8,115,878 B2
(45) Date of Patent: Feb. 14, 2012

(54) THIN FILM TRANSISTOR ARRAY SUBSTRATE AND LIQUID CRYSTAL DISPLAY

(75) Inventors: Te-Chen Chung, Kunshan (CN); Xia Huang, Kunshan (CN); Yanbing Qiao, Kunshan (CN); Liufei Zhou, Kunshan (CN); Yu-Wen Chiu, Kunshan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 185 days.

(21) Appl. No.: 12/768,753

(22) Filed: Apr. 28, 2010

(65) Prior Publication Data

US 2011/0157503 A1   Jun. 30, 2011

(30) Foreign Application Priority Data

Dec. 30, 2009   (CN) .......................... 2009 1 0258912

(51) Int. Cl.
*G09G 3/36* (2006.01)
*H01L 27/088* (2006.01)

(52) U.S. Cl. ............ 349/37; 349/139; 349/143; 257/59; 257/E27.111

(58) Field of Classification Search .................... 349/41, 349/42, 43, 56, 123, 128, 129, 130, 132, 349/138, 139, 143, 147, 37; 257/59, E33.053, 257/E27.111
See application file for complete search history.

(56) References Cited

U.S. PATENT DOCUMENTS

| 6,628,367 | B2* | 9/2003 | Hirabayashi et al. | ......... 349/187 |
| 7,426,003 | B2* | 9/2008 | Tien et al. | ................ 349/75 |
| 2004/0135952 | A1* | 7/2004 | Kurashina et al. | ............ 349/139 |
| 2005/0007528 | A1* | 1/2005 | Sakamoto et al. | ............ 349/123 |
| 2011/0157503 | A1* | 6/2011 | Chung et al. | .................... 349/37 |
| 2011/0261277 | A1* | 10/2011 | Chung et al. | .................... 349/43 |

* cited by examiner

*Primary Examiner* — Brian Healy
(74) *Attorney, Agent, or Firm* — Perkins Coie LLP; Aaron Wininger

(57) ABSTRACT

A TFT array substrate includes a plurality of scanning lines, a plurality of data lines and a plurality of pixel regions. Each pixel region includes a pixel electrode, a first TFT, a pull alignment electrode, a second TFT, a first and second push alignment electrodes, so that when a voltage is applied to the TFT array substrate, a transverse pull electric field is formed between the pixel electrode and the pull alignment electrode, and transverse push electric fields are formed respectively between the first push alignment electrode and the pixel electrode and between the second push alignment electrode and the pixel electrode. Accordingly, liquid crystal molecules of the TFT array substrate can respond quickly and it is not necessary to configure bumps on a color filter substrate, thereby improving contrast ratio, simplifying manufacture process and reducing costs.

20 Claims, 7 Drawing Sheets

THIN FILM TRANSISTOR ARRAY SUBSTRATE AND LIQUID CRYSTAL DISPLAY

CROSS-REFERENCE TO RELATED APPLICATION

This application claims priority to and expressly incorporates by reference Chinese patent application No. 200910258912.8 filed Dec. 30, 2009.

FIELD OF THE INVENTION

The present invention relates to the field of Thin Film Transistor Liquid Crystal Displays (TFT-LCD), and more particularly to a Vertical Alignment (VA) type TFT array substrate and a LCD having the TFT array substrate.

BACKGROUND

A Thin Film Transistor Liquid Crystal Display (TFT-LCD) is light, thin and small, and further has low power consumption, no radiation, low costs and other merits, thus dominating the current flat panel display field. The TFT-LCD is suitable for desktop computers, palmtop computers, Personal Digital Assistants (PDAs), cellular phones, televisions and various kinds of office automation devices and audio-visual devices. A liquid crystal display panel is a main component of the TFT-LCD, and usually includes a TFT array substrate (also called an array substrate), a color filter substrate and a liquid crystal layer between the TFT array substrate and the color filter substrate.

An array substrate in a conventional TFT-LCD usually includes a plurality of data lines and a plurality of scanning lines, and the data lines and the scanning lines intersect to define a plurality of pixel regions. A pixel electrode is formed in each pixel region, and a common electrode line is configured at a layer below a layer in which the pixel electrode is located. The pixel electrode and the common electrode line overlap and there is an insulation layer between the pixel electrode and the common electrode line, to form a storage capacitor in the pixel region. A TFT is configured near the intersection location of a data line and a scanning line, and includes a gate electrode, a semiconductor layer, a source electrode and a drain electrode. Generally, the gate electrode of the TFT is electrically connected with the scanning line, the source electrode is electrically connected with the data line, and the drain electrode is electrically connected with the pixel electrode.

Although the TFT-LCD dominates the flat panel display field at present, there are still technical problems with LCD panels, e.g., a wide viewing angle problem. That is, when a user watches an image respectively from directly in front of a screen versus at an angle to the screen, the image has different gray scales and brightness. Generally, the brightness of the image watched from straight ahead of the screen is higher than that of the image watched from an angle. A LCD panel which adopts a negative liquid crystal material with negative dielectric anisotropy and has a vertical alignment (VA) manner can provide a good contrast ratio because liquid crystal molecules are arranged vertically to the substrate when no voltage is applied. However, in order to achieve a multi-domain division effect, a VA type LCD usually has a problem of light leakage, which has an adverse impact on improving the contrast ratio of the LCD panel.

Referring to FIGS. 1 and 2, FIG. 1 is a schematic diagram illustrating a pixel structure of a conventional Multi-domain Vertical Alignment (MVA) type LCD panel, and FIG. 2 is a sectional view of the MVA type LCD panel along an A-A' line in FIG. 1. As shown in FIG. 2, the LCD panel mainly includes a TFT array substrate on a lower layer, a color filter substrate 80 on an upper layer, and liquid crystal molecules 70 between the TFT array substrate and the color filter substrate 80. There is a common electrode 81 on the color filter substrate 80. As shown in FIG. 1, the intersection of two adjacent scanning lines 10 and two adjacent data lines 20 define a pixel region. A pixel electrode shown in FIG. 1 includes two sub-pixel electrodes 30 and 40. In the MVA type LCD panel, slits 60 are usually configured on the TFT array substrate and bumps 50 are configured on the color filter substrate 80, so that the liquid crystal molecules 70 have pre-tilt angles towards different directions when no voltage is applied. In this way, the inclining direction of the liquid crystal molecules can be controlled effectively and rapidly after a voltage is applied. After the voltage is applied, the liquid crystal layer can be divided into multiple liquid crystal micro-domains with different inclining directions, so that viewing angle characteristics in gray scale display states watched from different viewing angles can be improved. However, to configure the bumps 50 on the color filter substrate 80 usually results in light leakage, which reduces the contrast ratio of the LCD panel. Furthermore, it is necessary to use a photo etching technology to form the bumps on the color filter substrate, which makes the manufacture process complex and increases costs.

SUMMARY

In view of the above, embodiments of the present invention provide a TFT array substrate and a LCD having the TFT array substrate.

Embodiments of the present invention provide a TFT array substrate including a plurality of scanning lines, a plurality of data lines and a plurality of pixel regions, wherein each pixel region is defined by intersection of two adjacent scanning lines and two adjacent data lines, and includes a pixel electrode and a first TFT for controlling the pixel electrode, and further includes a pull alignment electrode and a second TFT for controlling the pull alignment electrode, a first push alignment electrode and a second push alignment electrode; a projection of the pull alignment electrode on the TFT array substrate is located within the pixel electrode and is electrically insulated from the pixel electrode, and projections of the first push alignment electrode and the second push alignment electrode on the TFT array substrate are respectively located at two opposite sides of the pixel electrode; when a voltage is applied to the TFT array substrate, a transverse pull electric field is formed between the pull alignment electrode and the pixel electrode, transverse push electric fields are formed respectively between the first push alignment electrode and the pixel electrode and between the second push alignment electrode and the pixel electrode.

The present invention also provides a LCD including a LCD panel and a driving circuit connected with the LCD panel, where the LCD panel includes a Thin Film Transistor (TFT) array substrate as described above, a color filter substrate having a common electrode and a liquid crystal layer between the TFT array substrate and the color filter substrate.

According to the TFT array substrate and the LCD having the TFT array substrate provided by embodiments of the present invention, since a first push alignment electrode, a second push alignment electrode and a pull alignment electrode are configured in a pixel structure, when a voltage is applied to the TFT array substrate, a transverse pull electric field is formed between the pull alignment electrode and a pixel electrode, and transverse push electric fields are formed respectively between the first push alignment electrode and the pixel electrode and between the second push alignment electrode and the pixel electrode. Further, when the first push alignment electrode, the second push alignment electrode and the pull alignment electrode are powered on, the transverse pull electric field and the transverse push electric fields can make liquid crystal molecules tend to incline towards a vertical electric field formed by the pixel electrode on the TFT array substrate and the common electrode on the color filter substrate. Therefore, under the joint effects of the transverse pull electric field, the transverse push electric fields and the vertical electric field, the liquid crystal molecules can quickly respond. Further, it is not necessary to configure the bumps on the color filter substrate, which can improve the contrast ratio of the LCD, simplify the manufacture process, and reduce the costs.

DETAILED DESCRIPTION OF EMBODIMENTS

Figure 1:
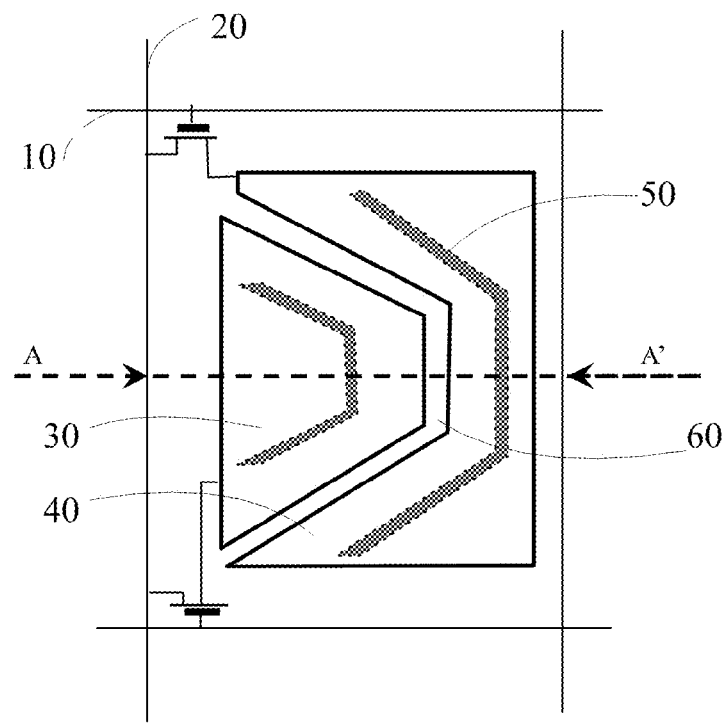
FIG. 1 is a schematic diagram illustrating a pixel structure of a conventional MVA type LCD panel.
Figure 2:
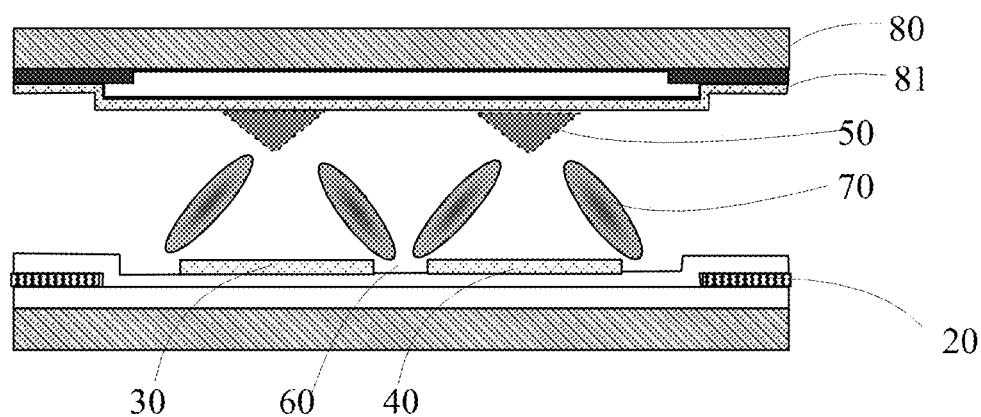
FIG. 2 is a sectional view illustrating the MVA type LCD panel along an A-A' line in FIG. 1.
Figure 3:
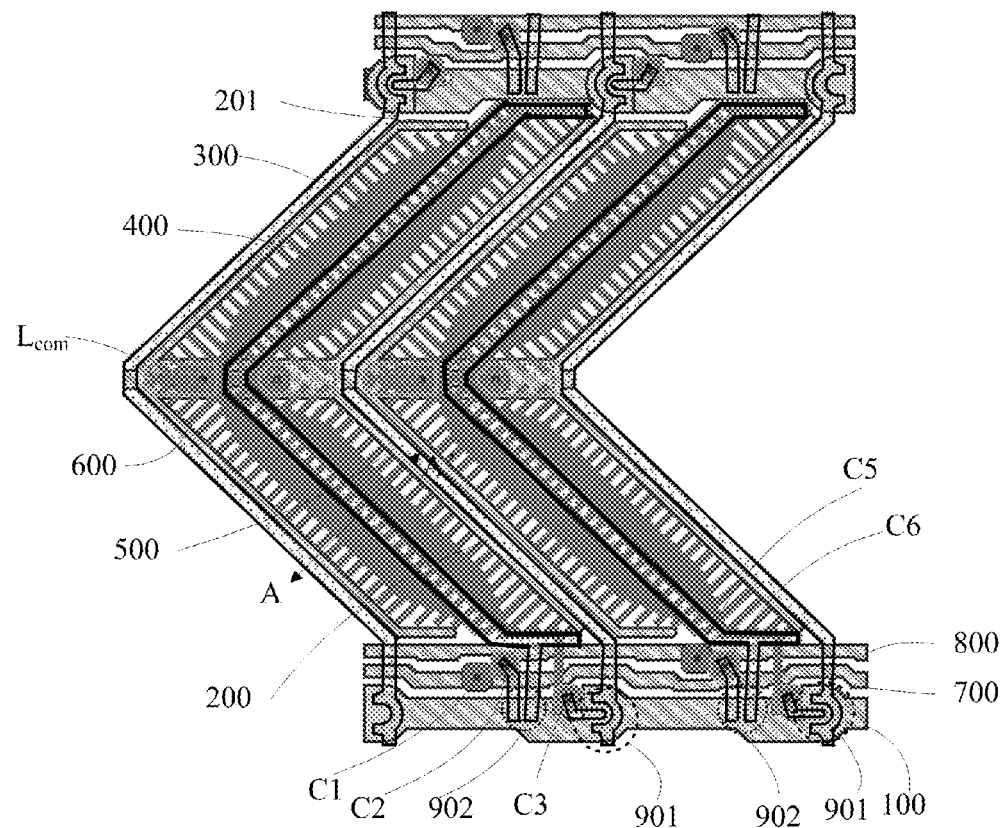
FIG. 3 is a planar schematic diagram illustrating a part of a TFT array substrate in accordance with a first embodiment of the present invention.
Figure 4:
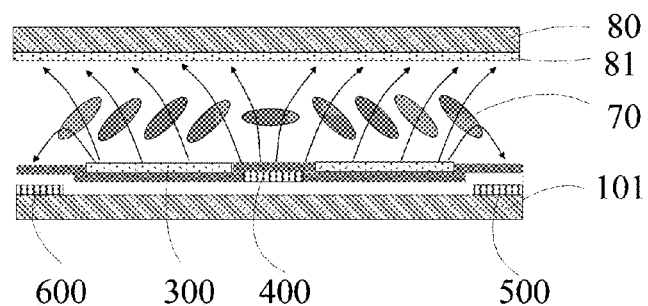
FIG. 4 is a sectional view illustrating the TFT array substrate along an A-A' line in FIG. 3.
Figure 5A:
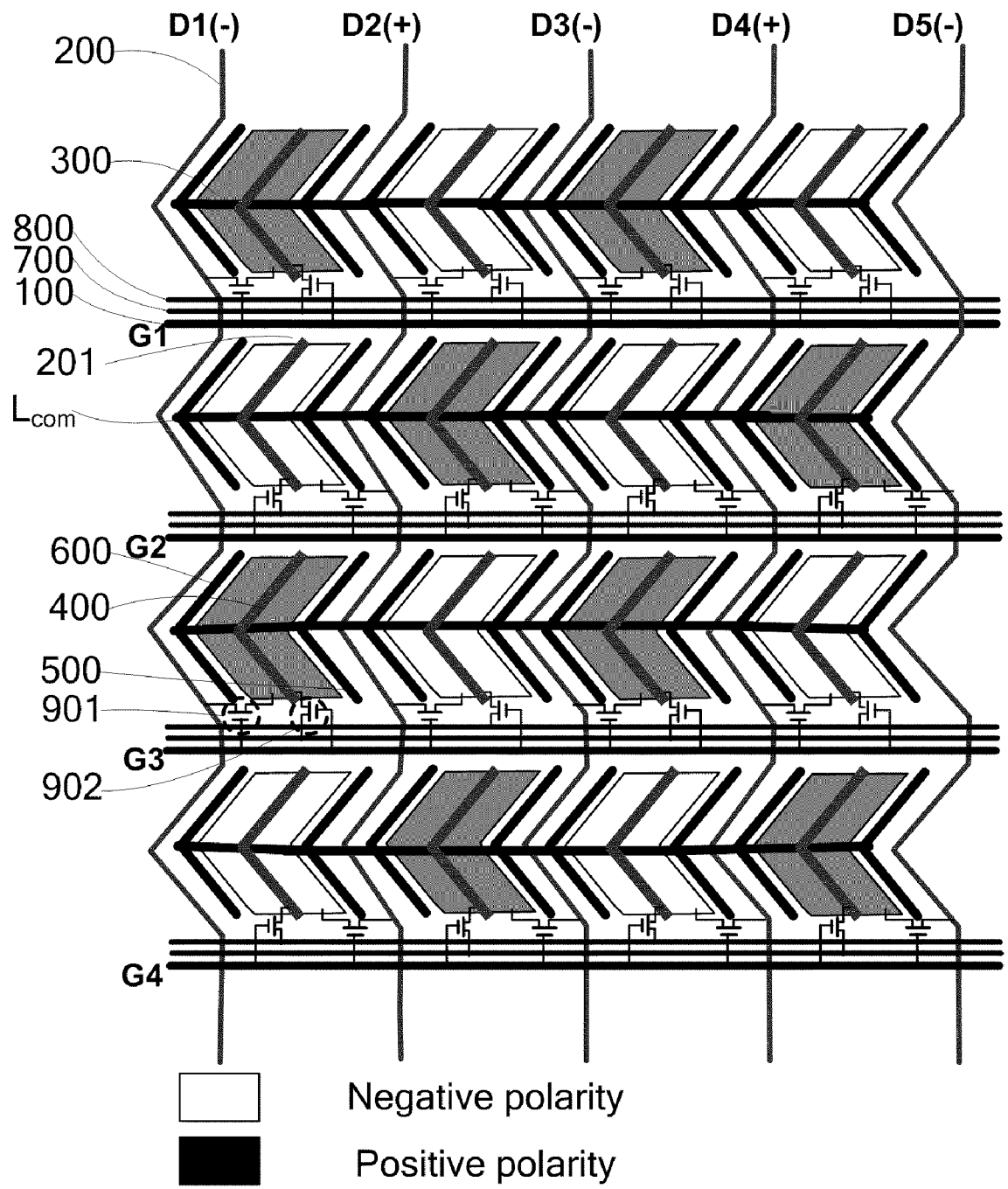
FIG. 5(a) is a schematic diagram illustrating a connection manner of a pixel structure of a LCD panel having no precharging function and adapted to implement a dot-inversion in accordance with the present invention.

A First Embodiment
As shown in FIG. 4, a LCD provided by an embodiment of the present invention includes a LCD panel and a driving circuit (not shown) connected with the LCD panel. The LCD panel includes a TFT array substrate 101, a color filter substrate 80 and a liquid crystal layer 70 between the TFT array substrate 101 and the color filter substrate 80, and a common electrode 81 is configured on the color filter substrate 80.
FIG. 3 is a planar schematic diagram illustrating a part of a TFT array substrate in accordance with the first embodiment of the present invention. Referring to FIG. 3 and FIG. 5(a), the TFT array substrate 101 includes a plurality of scanning lines 100, a plurality of data lines 200 insulatively intersecting with the scanning lines 100, and a plurality of pixel regions 201 defined by the intersection of the scanning lines 100 and the data lines 200. Each pixel region 201 is defined by the intersection of two adjacent scanning lines 100 and two adjacent data lines 200, and includes a pixel electrode 300, a first TFT 901 for controlling the pixel electrode 300, a first push alignment electrode 500, a second push alignment electrode 600, a pull alignment electrode 400 and a second TFT 902 for controlling the pull alignment electrode 400. The projections of the first push alignment electrode 500 and the second push alignment electrode 600 on the TFT array substrate are respectively located at two opposite sides of the pixel electrode 300, and both the first push alignment electrode 500 and the second push alignment electrode 600 extend along the direction of the edge of the pixel electrode 300. The projection of the pull alignment electrode 400 on the TFT array substrate is located within the pixel electrode 300 and is electrically insulated from the pixel electrode 300. When a voltage is applied to the TFT array substrate, a transverse pull electric field is formed between the pull alignment electrode 400 and the pixel electrode 300, and transverse push electric fields are formed respectively between the first push alignment electrode 500 and the pixel electrode 300 and between the second push alignment electrode 600 and the pixel electrode 300. As shown in FIG. 3, a common electrode line $L_{com}$ includes a main part approximately parallel to the scanning lines 100, and two extending parts extending from the main part and along a direction which is approximately parallel to the pixel electrode 300. The two extending parts of the common electrode line $L_{com}$ are respectively located at two opposite sides of the pixel electrode 300 in each pixel region. In this embodiment, the first push alignment electrode 500 and the second push alignment electrode 600 are formed by the two extending parts of the common electrode line $L_{com}$. The gate electrode of the first TFT 901 is electrically connected with the scanning line 100, the source electrode is electrically connected with the data line 200 and the drain electrode is electrically connected with the pixel electrode 300. The TFT array substrate further includes a first pull alignment line 700 and a second pull alignment line 800 which are both approximately parallel to the scanning lines. In FIG. 5(a), each scanning line 100 is located between two adjacent lines of pixels. For each scanning line, the first pull alignment line 700 and the second pull alignment line 800 are approximately parallel to the scanning line and are located between the two adjacent lines of pixels. The first pull alignment line 700 is located at the upper of the scanning line 100, and is approximately parallel to and adjacent to the scanning line 100, and the second pull alignment line 800 is located at the above the first pull alignment line 700, and is approximately parallel to and adjacent to the first pull alignment line 700. FIG. 3 only illustrates a structure of two adjacent pixels in the same line. For a pixel on the left side in FIG. 3, the source electrode of the first TFT 901 is electrically connected with the data line 200, and the drain electrode of the first TFT 901 is electrically connected with the pixel electrode 300 via a through hole C3. Both the gate electrode of the first TFT 901 and the gate electrode of the second TFT 902 are electrically connected with the scanning line 100. In this embodiment, the first pull alignment line 700 and the second pull alignment line 800 are formed on a first metal layer, and the source electrode and drain electrode of the second TFT 902 are formed on a second metal layer. Therefore, the first pull alignment line 700 on the first metal layer can be electrically connected with a pixel electrode material layer (which is usually Indium Tin Oxide (ITO) for example) via a through hole C1 which passes through a passivation layer and a gate insulation layer below the pixel electrode material layer, and the source electrode of the second TFT 902 on the second metal layer can be electrically connected with the pixel electrode material layer via a through hole C2 which passes through the passivation layer, and thus the first pull alignment line 700 can be electrically connected with the source electrode of the second TFT 902 via the through holes C1 and C2 and the pixel electrode material layer between the through holes C1 and C2. The pull alignment electrode 400 is formed on the second metal layer and has a strip shape, and the projection of the pull alignment electrode 400 on the TFT array substrate is located approximately in a middle of the pixel electrode 300. The drain electrode of the second TFT 902 is electrically connected with the pull alignment electrode 400. For the pixel on the right side in FIG. 3, the second pull alignment line 800 is electrically connected, via through holes C5 and C6, with the source electrode of the second TFT 902 in the pixel where the second pull alignment line 800 is located. Likewise, the second pull alignment line 800 on the first metal layer can be electrically connected with the pixel electrode material layer via a through hole C5 which passes through the passivation layer and the gate insulation layer below the pixel electrode material layer, and the source electrode of the second TFT 902 on the second metal layer can be electrically connected with the pixel electrode material layer via a through hole C6 which passes through the passivation layer, and thus the second pull alignment line 800 can be electrically connected with the source electrode of the second TFT 902 via the through holes C5 and C6 and the pixel electrode material layer between the through holes C5 and C6. The above connection manner is merely an example, and embodiments of the present invention are not limited to the above connection manner. Other connection manners can also be used to implement the connection between the source electrode of the second TFT 902 and the first pull alignment line 700, the connection between the source electrode of the second TFT 902 and the second pull alignment line 800, and the electrical connection between the drain electrode of the second TFT 902 and the pull alignment electrode 400.

In this embodiment, the formation of the TFT array substrate 101 may adopt a conventional five-mask manufacture process. Specifically, a first metal layer is formed on an insulation substrate, and a patterning process is performed on the first metal layer to form the gate electrode of the first TFT 901, the gate electrode of the second TFT 902, the scanning lines 100, the first pull alignment line 700, the second pull alignment line 800, the main part of the common electrode line $L_{com}$, and the first push alignment electrode 500 and the second push alignment electrode 600 which are formed by the two extending parts of the common electrode line $L_{com}$; then a gate insulation layer, an amorphous silicon layer and an impure amorphous silicon layer are formed in turn, and a patterning process is performed on the impure amorphous silicon layer and the amorphous silicon layer to form semiconductor layers of the first TFT 901 and the second TFT 902. Afterwards, a second metal layer is formed, and a patterning process is performed on the second metal layer to form the source electrode and drain electrode of the first TFT 901, the source electrode and drain electrode of the second TFT 902, the data lines 200 and the pull alignment electrode 400. Afterwards, a passivation layer is deposited, a patterning process is performed on the passivation layer to form the through holes C1, C2, C3, C5 and C6, wherein the through holes C2, C3 and C6 only penetrate the passivation layer to implement the electrical connection between the second metal layer and the pixel electrode material layer above the second metal layer, and the through holes C1 and C5 need to penetrate the passivation layer and the gate insulation layer below the passivation layer to implement the electrical connection between the first metal layer and the pixel electrode material layer. Finally, a transparent conductive material layer is formed, and a patterning process is performed on the transparent conductive material layer to form the pixel electrode 300, and the through holes C1 and C2 are electrically connected with each other via the pixel electrode material layer covering on the through holes C1 and C2, and C5 and C6 are electrically connected with each other via the pixel electrode material layer covering on the through holes C5 and C6.

FIG. 5(*a*) is a schematic diagram illustrating a connection manner of a pixel structure of a LCD panel having no precharging function and adapted to implement a dot-inversion according to an embodiment of the present invention. In the connection manner of the pixel structure of the LCD panel shown in FIG. 5(*a*), the gate electrodes of the first TFT 901 and the second TFT 902 in the same pixel region are electrically connected with the same scanning line 100. In this embodiment, the first pull alignment line 700 is connected with all the pull alignment electrodes located in pixel regions in odd lines and odd columns and in even lines and even columns via the second TFT 902, and the second pull alignment line 800 is connected with all the pull alignment electrodes 400 located in pixel regions in even lines and odd columns and in odd lines and even columns via the second TFT 902. A pixel in the second line and the second column shown in FIG. 5(*a*) is taken as a reference pixel, the first push alignment electrode 500 and the second push alignment electrode 600 of the reference pixel are formed by two extending parts of the common electrode line $L_{com}$, the gate electrodes of the first TFT 901 and the second TFT 902 of the reference pixel are electrically connected with the same scanning line G2, and a voltage is applied to the pixel electrode 300 and the pull alignment electrode 400 of the reference pixel simultaneously, and thus a precharging process is not carried out for the pull alignment electrode 400 in advance.

The voltage signal on the pixel electrode 300 of the reference pixel is from a data line D3, which is electrically connected with the pixel electrode 300 via the first TFT 901 of the reference pixel. The LCD panel adopts a column inversion driving manner shown in FIG. 5(*a*). Adjacent data lines in the same frame have different polarities, e.g., D1, D3 and D5 in FIG. 5(*a*) have negative polarities, and D2 and D4 have positive polarities. In the same frame, the pixel electrodes in pixel regions in odd lines and odd columns and in even lines and even columns have different polarities from the pixel electrodes in pixel regions in odd lines and even columns and in even lines and odd columns. The pixel electrodes in pixel regions in odd lines and odd columns and in even lines and even columns have negative polarities, and the pixel electrodes in pixel regions in odd lines and even columns and in even lines and odd columns have positive polarities. Therefore, in the same frame, the polarity of a pixel electrode of any one pixel is opposite to the polarities of pixel electrodes of pixels adjacent to the pixel. In the next frame, the polarity of the voltage applied to the data line is inversed, i.e., the pixel electrodes in pixel regions in odd lines and odd columns and in even lines and even columns have positive polarities, and the pixel electrodes in pixel regions in odd lines and even columns and in even lines and odd columns have negative polarities, thus a dot-inversion display effect of the pixels in the LCD panel is achieved, which can effectively reduce flicker of the LCD panel.

FIG. 4 is a sectional view illustrating the TFT array substrate along an A-A' line in FIG. 3. The first push alignment electrode 500 and the second push alignment electrode 600 on the TFT array substrate 101 are respectively located at two sides of the pull alignment electrode 400. The pull alignment electrode 400 is formed on the second metal layer and is located on the same layer as the data lines. The first push alignment electrode 500 and the second push alignment electrode 600 are formed by the two extending parts of the common electrode line $L_{com}$, and are formed on the first metal layer. When the LCD panel is on, the LCD panel adopts a column inversion driving manner, and adjacent data lines in the same frame have different polarities. Both the first pull alignment line 700 and the second pull alignment line 800 adopt a frame inversion driving manner, and the first pull alignment line 700 and the second pull alignment line 800 in the same frame have opposite polarities all the time. The direction indicated by the arrow in FIG. 4 is an approximate direction of the electric field in the pixel region of the LCD panel when the LCD panel is provided with electric power. The pull alignment electrode 400 has the same polarity as the pixel electrode 300 in the pixel region where the pull alignment electrode 400 is located, but there is a voltage difference therebetween; in an embodiment, the voltage difference between the pull alignment electrode 400 and the common electrode 81 is larger than the voltage difference between the pixel electrode 300 and the common electrode 81. Specifically, for a pixel electrode 300 with a positive polarity, the pull alignment electrode 400 also has a positive polarity, and the voltage on the pull alignment electrode 400 with a positive polarity is larger than the voltage on the pixel electrode 300 with a positive polarity; for a pixel electrode 300 with a negative polarity, the pull alignment electrode 400 also has a negative polarity, and the voltage on the pull alignment electrode 400 with a negative polarity is smaller than the voltage on the pixel electrode 300 with a negative polarity; and thus, a transverse pull electric field is formed between the pull alignment electrode 400 and the pixel electrode 300. Because both the first push alignment electrode 500 and the second push alignment electrode 600 are formed by two extending parts of the common electrode line $L_{com}$, the first push alignment electrode 500 and the second push alignment electrode 600 have the same voltage as the common electrode. In this embodiment, in the same pixel region, both voltage differences between the first push alignment electrode and the pixel electrode and between the second push alignment electrode and the pixel electrode equal to the voltage difference between the pixel electrode and the common electrode, there is voltage differences respectively between the first push alignment electrode 500 and the pixel electrode 300, and between the second push alignment electrode 600 and the pixel electrode 300, so transverse push electric fields are formed respectively between the first push alignment electrode 500 and the pixel electrode 300 and between the second push alignment electrode 600 and the pixel electrode 300. A vertical electric field is formed between the pixel electrode 300 and the common electrode 81 on the color filter substrate 80. When the first push alignment electrode 500, the second push alignment electrode 600 and the pull alignment electrode 400 are powered on, the transverse pull electric field makes the liquid crystal molecules 70 tend to incline towards the direction of the vertical electric filed, and meanwhile the transverse push electric fields make the liquid crystal molecules tend to incline towards the direction of the vertical electric field. Therefore, under the joint effects of the transverse pull electric field, the transverse push electric fields and the vertical electric field, the liquid crystal molecules 70 can respond quickly.

Compared with conventional systems, embodiments of the present invention configure a pull alignment electrode 400, a first push alignment electrode 500 and a second push alignment electrode 600 on the TFT array substrate 101, wherein the projection of the pull alignment electrode 400 on the TFT array substrate is located within the pixel electrode 300 and is electrically insulated from the pixel electrode 300, and the projections of the first push alignment electrode 500 and the second push alignment electrode 600 on the TFT array substrate 101 are respectively located at two opposite sides of the pixel electrode. Therefore, when a voltage is applied to the TFT array substrate 101, a transverse pull electric field is formed between the pull alignment electrode 400 and the pixel electrode 300, and transverse push electric fields are formed respectively between the first push alignment electrode 500 and the pixel electrode 300 and between the second push alignment electrode 600 and the pixel electrode 300. When the first push alignment electrode 500, the second push alignment electrode 600 and the pull alignment electrode 400 are powered on, the transverse pull electric field and the transverse push electric fields can make the liquid crystal molecules tend to incline towards a direction of the vertical electric field, and thus the liquid crystal molecules can respond quickly. In addition, it is not necessary to configure bumps on the color filter substrate 80 when a TFT array substrate with the above pixel structure is adopted, so a photo etching process is saved in the manufacture process of the color filter substrate 80, which can simplify the manufacture process, reduce costs, and improve the contrast ratio of the LCD panel.

In addition, this embodiment may also adopt the connection manner of pixel structure of a LCD panel shown in FIG. 5(*b*). FIG. 5(*b*) is a schematic diagram illustrating a connection manner of a pixel structure of a LCD panel having half-precharging function and adapted to implement a dot-inversion according to the present invention. The similarities between FIG. 5(*b*) and FIG. 5(*a*) are not further described herein, and the differences between FIG. 5(*b*) and FIG. 5(*a*) lie in that: in FIG. 5(*b*), for pixel regions in odd lines and odd columns and in even lines and even columns, the gate electrodes of the first TFT and the second TFT in the same pixel region are connected with the same scanning line; for pixel regions in odd lines and even columns and in even lines and odd columns, the gate electrodes of the first TFT and the second TFT in the same pixel region are connected with different scanning lines. Besides the same merits of the above LCD panel shown in FIG. 5(*a*), the LCD panel shown in FIG. 5(*b*) can also implement the connection manner of the pixel structure having half-precharging function. Of course, the pixel structure shown in FIG. 5(*b*) may also adopt other similar arrangement manners. For example, for pixel regions in odd lines and odd columns and in even lines and even columns, the gate electrodes of the first TFT and the second TFT in the same pixel region are connected with different scanning lines; for pixel regions in odd lines and even columns and in even lines and odd columns, the gate electrodes of the first TFT and the second TFT in the same pixel region are connected with the same scanning line, which can also achieve the connection manner of the pixel structure of the LCD panel having half-precharging function and adapted to implement a dot-inversion. Referring to FIG. 5(*b*), when a voltage is applied to a scanning line G0, the second TFTs of the pixels in all even columns and the first line are turned on to precharge the pull alignment electrodes of pixels in all even columns and the first line. When a voltage is applied to a scanning line G1, the first TFTs of the pixels in the first line are turned on, and then voltage signals from the data lines are applied to the pixel electrodes of the pixels in the first line; meanwhile the scanning line G1 also makes the second TFTs of the pixels in all odd columns and the second line turn on to precharge the pull alignment electrodes of the pixels in all odd columns and the second line, and thus a connection manner is implemented in which one half of pixels in the LCD panel are precharged and the other half of pixels are not precharged.

Figure 5B:
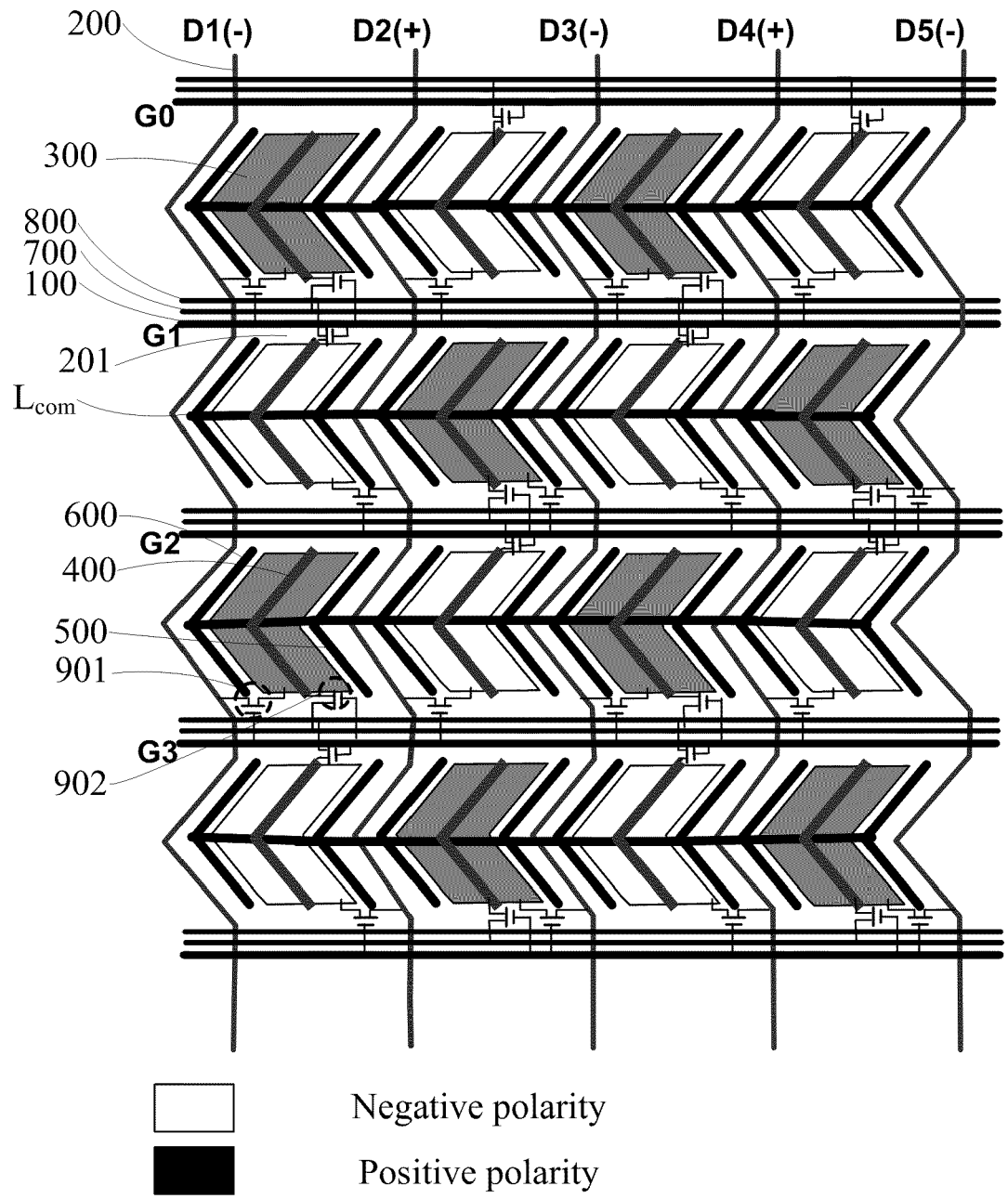
FIG. 5(b) is a schematic diagram illustrating a connection manner of a pixel structure of a LCD panel having half-precharging function and adapted to implement a dot-inversion in accordance with the present invention.
Figure 5C:
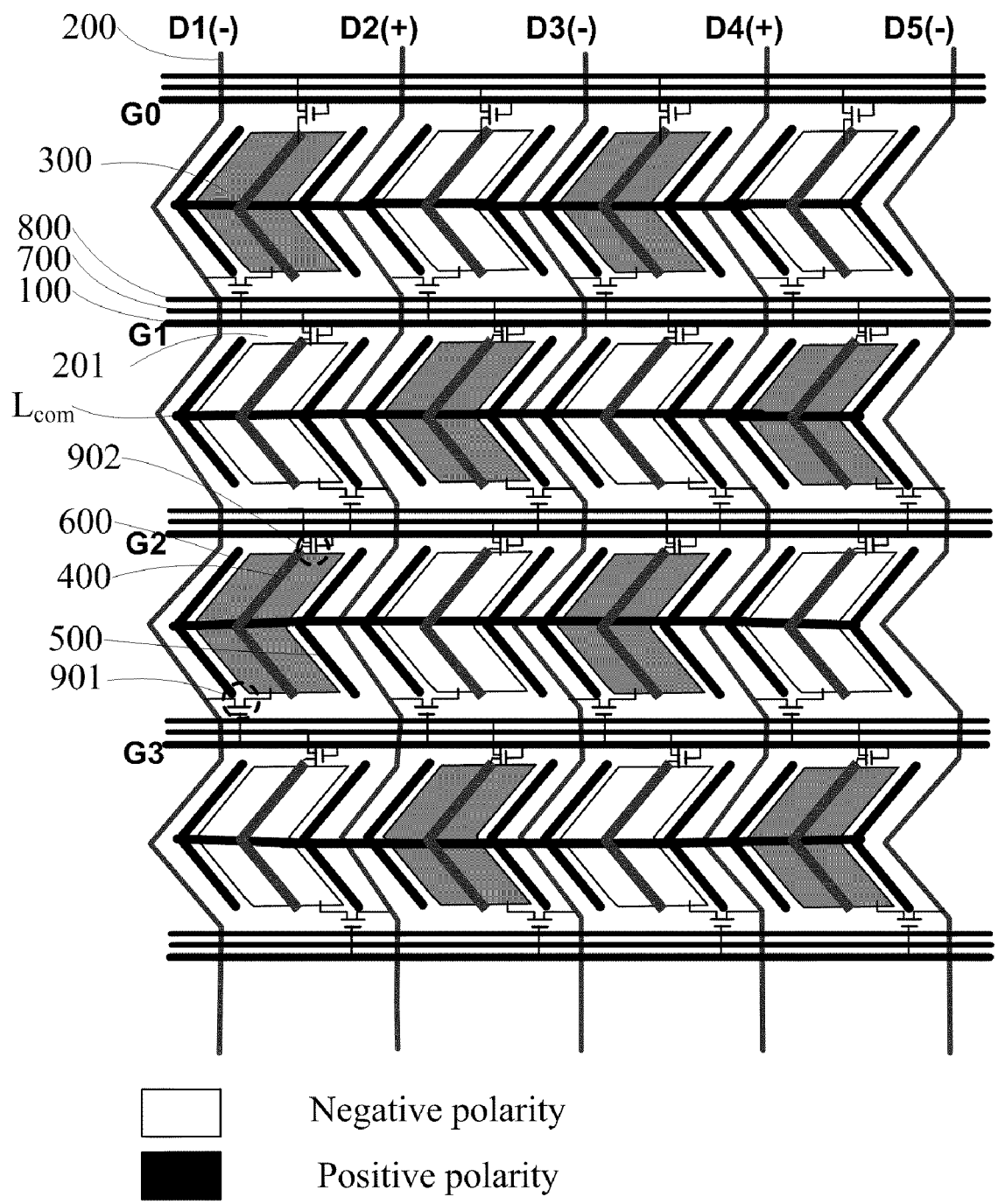
FIG. 5(c) is a schematic diagram illustrating a connection manner of a pixel structure of a LCD panel having precharging function and adapted to implement a dot-inversion in accordance with the present invention.

Besides, this embodiment may also adopt a connection manner of a pixel structure of a LCD panel shown in FIG. 5(c). FIG. 5(c) is a schematic diagram illustrating a connection manner of a pixel structure of a LCD panel having precharging function and adapted to implement a dot-inversion according to the present invention. The similarities between FIG. 5(c) and FIG. 5(a) are not further described herein, and the differences between FIG. 5(c) and FIG. 5(a) lie in that: in FIG. 5(c), the gate electrodes of the first TFT and the second TFT in the same pixel region are electrically connected with different scanning lines. Besides the same merits of the above LCD panel shown in FIG. 5(a), the LCD panel shown in FIG. 5(c) can also implement a connection manner of the pixel structure having precharging function. Referring to FIG. 5(c), when a voltage is applied to a scanning line G0, the second TFTs of all the pixels in the first line are turned on to precharge the pull alignment electrodes of all the pixels in the first line; when a voltage is applied to a scanning line G1, the first TFTs of all the pixels in the first line are turned on, and voltage signals from the data lines are applied to the pixel electrodes of all the pixels in the first line; and thus, all the pixels in the LCD panel are pre-charged.

As shown in FIG. 3, the pixel electrode 300 has a fishbone shape, which makes liquid crystal molecules neighboring the fishbone respond quickly under the effect of the an electric field at the fishbone. In addition, the pixel electrode 300 in each pixel region is approximately in a V-shape or a Z-shape, so that multiple micro-domains are generated in the pixel and declination lines generated in the micro-domains are eliminated to achieve a relatively high transmissivity. The pixel electrode 300 may have at least one slit hole in an overlapping region of the pixel electrode 300 and the projection of the pull alignment electrode 400 on the TFT array substrate, which can reduce the shielding effect of the pixel electrode 300 on the electric fields between the pull alignment electrode 400 and the pixel electrode 300 and between the pull alignment electrode 400 and the common electrode 81 on the color filter substrate 80. In order to increase the storage capacitance in a pixel, a partial second metal layer may be configured between the common electrode line $L_{com}$ and the pixel electrode 300, and the partial second metal layer is electrically connected with the pixel electrode 300 via a through hole.

A Second Embodiment

Similarities between the second embodiment and the first embodiment will not be further described. The main differences between the second embodiment and the first embodiment lie in that: the first push alignment electrode in the second embodiment is formed by a data line electrically connected with a pixel electrode in a pixel region which is in the same line as and adjacent to the pixel region where the first push alignment electrode is located, and the second push alignment electrode is formed by an extending part of the common electrode line in the pixel region where the second push alignment electrode is located.

Figure 6:
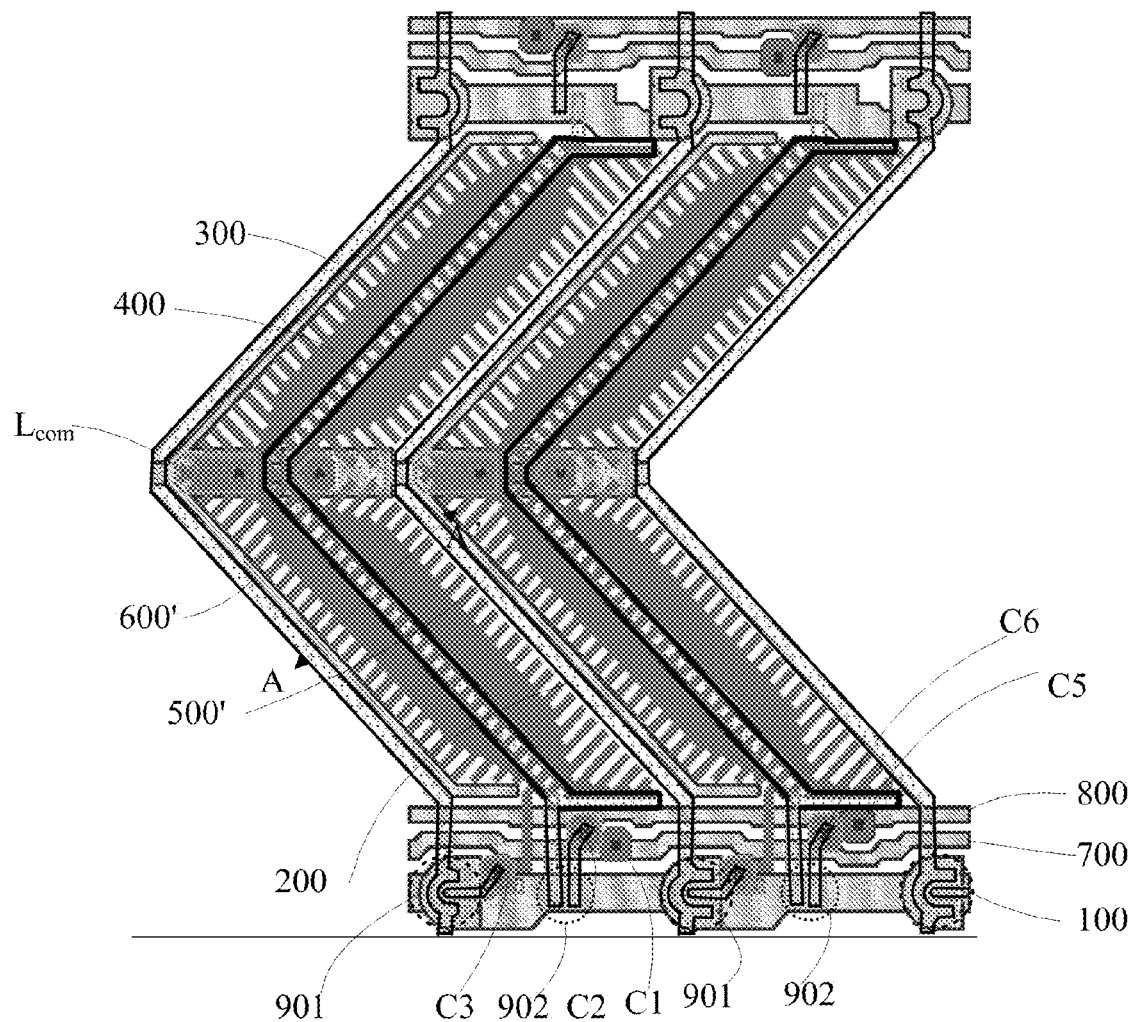
FIG. 6 is a planar schematic diagram illustrating a part of a TFT array substrate in accordance with a second embodiment of the present invention.

As shown in FIG. 6, the first push alignment electrode 500' is formed by a data line electrically connected with a pixel electrode in a pixel region which is in the same line as and adjacent to the pixel region where the first push alignment electrode 500' is located, and the second push alignment electrode 600' is formed by an extending part of the common electrode line $L_{com}$ in the pixel region where the second push alignment electrode 600' is located. The first push alignment electrode 500' of the pixel on the left side in FIG. 6 is formed by the data line electrically connected with the source electrode of the first TFT of the pixel on the right side, and the drain electrode of the first TFT is electrically connected with the pixel electrode in the pixel region where the first TFT is located. Both the first push alignment electrode 500' and the second push alignment electrode 600' extend along the direction of the edge of the pixel electrode 300.

In this embodiment, the formation of the TFT array substrate may also adopt the conventional five-mask process. Specifically, a first metal layer is formed on an insulation substrate, and a patterning process is performed on the first metal layer to form the gate electrode of the first TFT 901, the gate electrode of the second TFT 902, the scanning lines 100, the first pull alignment line 700, the second pull alignment line 800, the common electrode line $L_{com}$, and the second push alignment electrode 600' formed by the extending parts of the common electrode line $L_{com}$; then a gate insulation layer, an amorphous silicon layer and an impure amorphous silicon layer are formed in turn, and a patterning process is performed on the impure amorphous silicon layer and the amorphous silicon layer to form a semi-conductor layers of the first TFT 901 and the second TFT 902. Afterwards, the second metal layer is formed, and a patterning process is performed on the second metal layer to form the source electrode and drain electrode of the first TFT 901, the source electrode and drain electrode of the second TFT 902, the data lines 200 and the pull alignment electrode 400. Afterwards, a passivation layer is deposited, a patterning process is performed on the passivation layer to form the through holes C1, C2, C3, C5 and C6, wherein the through holes C2, C3 and C6 only penetrate the passivation layer to implement the electrical connection between the second metal layer and the pixel electrode material layer above the second metal layer, and the through holes C1 and C5 need to penetrate the passivation layer and the gate insulation layer below the passivation layer to implement the electrical connection between the first metal layer and the pixel electrode material layer; finally, a transparent conductive material layer is formed, and a patterning process is performed on the transparent conductive material layer to form the pixel electrode 300; meanwhile, the through holes C1 and C2 are electrically connected with each other via the pixel electrode material layer covering on the through holes C1 and C2, and the through holes C5 and C6 are electrically connected with each other via the pixel electrode material layer covering on the through holes C5 and C6.

Likewise, in this embodiment, when the LCD panel is on, the pull alignment electrode 400 has the same polarity as the pixel electrode 300 in the pixel region where the pull alignment electrode 400 is located, but there is a voltage difference therebetween; the voltage difference between the pull alignment electrode 400 and the common electrode 81 is larger than the voltage difference between the pixel electrode 300 and the common electrode 81; and thus a transverse pull electric field can be formed between the pull alignment electrode 400 and the pixel electrode 300. The first push alignment electrode 500' is formed by a data line electrically connected with a pixel electrode in a pixel region which is in the same line as and adjacent to the pixel region where the first push alignment electrode 500' is located, and adjacent data lines in the same frame have opposite polarities, so the polarity of the first push alignment electrode 500' is opposite to the polarity of the pixel electrode 300 all the time. Thus, in this embodiment, the voltage difference between the first push alignment electrode and the pixel electrode is larger than the voltage difference between the pixel electrode and the common electrode. The second push alignment electrode 600' is formed by an extending part of the common electrode line $L_{com}$, and has the same voltage as the common electrode 81. Therefore, the voltage difference between the second push alignment electrode 600' and the pixel electrode 300 equals to the voltage difference between the pixel electrode 300 and the common electrode 81. In this way, transverse push electric fields can be formed respectively between the first push alignment electrode 500' and the pixel electrode 300 and between the second push alignment electrode 600' and the pixel electrode 300. A vertical electric field is formed between the pixel electrode 300 and the common electrode 81 on the color filter substrate 80. When the first push alignment electrode 500', the second push alignment electrode 600' and the pull alignment electrode 400 are powered on, the transverse pull electric field can make the liquid crystal molecules 70 tend to incline towards a direction of the vertical electric field, and meantime, the transverse push electric fields can make the liquid crystal molecules 70 tend to incline towards the direction of the vertical electric field. In this way, under the joint effects of the transverse pull electric field, the transverse push electric fields and the vertical electric field, the liquid crystal molecules can respond quickly. In addition, it is not necessary to configure bumps on the color filter substrate 80 when a TFT array substrate with the above pixel structure is adopted, so a photo etching process is saved in the manufacture process of the color filter substrate 80, which can simplify the manufacture process, reduce the costs, and improve the contrast ratio of the LCD panel.

A LCD adopting the TFT array substrate of this embodiment may also adopt any of the connection manners of pixel structures shown in FIGS. 5(a) 5(b) and 5(c) to implement a dot inversion, and this will not be further described herein.

A Third Embodiment

Similarities between the third embodiment and the first embodiment will not be further described. The main differences between the third embodiment and the first and second embodiments lie in that: the first push alignment electrode in the third embodiment is formed by an extending part of a pixel electrode in one pixel region which is in the same line as and adjacent to the pixel region where the first push alignment electrode is located, and the second push alignment electrode is formed by a data line electrically connected with a pixel electrode in the other pixel region which is in the same line as and adjacent to the pixel region where the second push alignment electrode is located.

Figure 7:
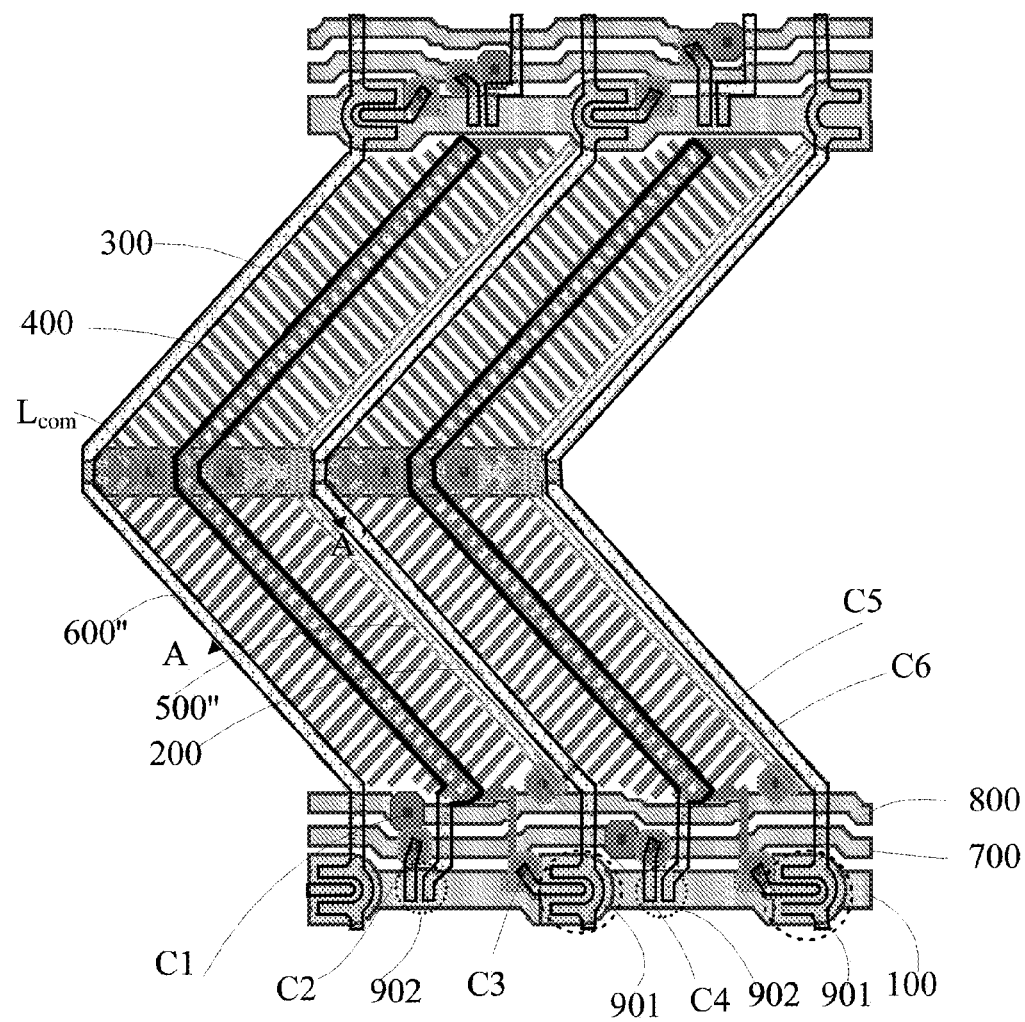
FIG. 7 is a planar schematic diagram illustrating a part of a TFT array substrate in accordance with a third embodiment of the present invention.

As shown in FIG. 7, the first push alignment electrode 500" is formed by an extending part of a pixel electrode in one pixel region which is in the same line as and adjacent to the pixel region where the first push alignment electrode 500" is located. The extending part of the pixel electrode can be replaced by the second metal layer, and the second metal layer is electrically connected, via a through hole C4, with the pixel electrode in the pixel region which is in the same line as and adjacent to the pixel region where the first push alignment electrode 500" is located. The second push alignment electrode 600" is formed by a data line electrically connected with the pixel electrode in the other pixel region which is in the same line as and adjacent to the pixel region where the second push alignment electrode is located. Both the first push alignment electrode 500" and the second push alignment electrode 600" extend along the direction of the edge of the pixel electrode 300.

In this embodiment, the formation of the TFT array substrate may also adopt the conventional five-mask process. Specifically, a first metal layer is formed on an insulation substrate, and a patterning process is performed on the first metal layer to form the gate electrode of the first TFT 901, the gate electrode of the second TFT 902, the scanning lines 100, the common electrode line $L_{com}$, the first pull alignment line 700 and the second pull alignment line 800; then a gate insulation layer, an amorphous silicon layer and an impure amorphous silicon layer are formed in turn, and a patterning process is performed on the impure amorphous silicon layer and the amorphous silicon layer to form semi-conductor layers of the first TFT 901 and the second TFT 902. Afterwards, the second metal layer is formed, and a patterning process is performed on the second metal layer to form the source electrode and drain electrode of the first TFT 901, the source electrode and drain electrode of the second TFT 902, the data lines 200, the pull alignment electrode 400 and the first push alignment electrode 500". A passivation layer is then deposited, and a patterning process is performed on the passivation layer to form the through holes C1, C2, C3, C4, C5 and C6, wherein the through holes C2, C3, C4 and C6 only penetrate the passivation layer to implement the electrical connection between the second metal layer and the pixel electrode material layer above the second metal layer, and the through holes C1 and C5 need to penetrate the passivation layer and the gate insulation layer below the passivation layer to implement the electrical connection between the first metal layer and the pixel electrode material layer. Finally, a transparent conductive material layer is formed, and a patterning process is performed on the transparent conductive material layer to form the pixel electrode 300. Meantime, the through holes C1 and C2 are electrically connected with each other via the pixel electrode material layer covering on the through holes C1 and C2, and the through holes C5 and C6 are electrically connected with each other via the pixel electrode material layer covering on the through holes C5 and C6. In FIG. 7, the pixel electrode in the pixel region on the right side is electrically connected with the first push alignment electrode 500' in the pixel region on the left side via the through hole C4.

Likewise, in this embodiment, when the LCD panel is on, the pull alignment electrode 400 has the same polarity as the pixel electrode 300 in the pixel region where the pull alignment electrode 400 is located, but there is a voltage difference therebetween. The voltage difference between the pull alignment electrode 400 and the common electrode 81 is larger than the voltage difference between the pixel electrode 300 and the common electrode 81. Therefore, a transverse pull electric field can be formed between the pull alignment electrode 400 and the pixel electrode 300. The first push alignment electrode 500" is formed by an extending part of a pixel electrode in a pixel region which is in the same line as and adjacent to the pixel region where the first push alignment electrode 500" is located. In this embodiment, the extending part of the pixel electrode is replaced by the second metal layer, and the second metal layer is electrically connected, via the through hole C4, with the pixel electrode in the pixel region which is in the same line as and adjacent to the pixel region where the first push alignment electrode 500" is located. Since adjacent data lines in the same frame have opposite polarities, the polarity of the first push alignment electrode 500" is the same as the polarity of the pixel electrode whose extending part forms the first push alignment electrode 500", and is opposite to the polarity of the pixel electrode 300 in the pixel region where the first push alignment electrode 500" is located. Therefore, in this embodiment, the voltage difference between the first push alignment electrode 500" and the pixel electrode 300 is larger than the voltage difference between the pixel electrode 300 and the common electrode 81. The second push alignment electrode 600" is formed by a data line electrically connected with a pixel electrode in the other pixel region which is in the same line as and adjacent to the pixel region where the second push alignment electrode 600' is located. Since adjacent data lines in the same frame have opposite polarities, the polarity of the second push alignment electrode 600" is opposite to the polarity of the pixel electrode 300 in the pixel region where the second push alignment electrode 600" is located. Therefore, in this embodiment, the voltage difference between the second push alignment electrode 600" and the pixel electrode 300 is also larger than the voltage difference between the pixel electrode and the common electrode. In this way, transverse push electric fields can be formed respectively between the first push alignment electrode 500" and the pixel electrode 300 and between the second push alignment electrode 600" and the pixel electrode 300. A vertical electric field is formed between the pixel electrode 300 and the common electrode 81 on the color filter substrate 80. When the first push alignment electrode 500', the second push alignment electrode 600' and the pull alignment electrode 400 are powered on, the transverse pull electric field can make the liquid crystal molecules 70 tend to incline towards a direction of the vertical electric field, and meanwhile, the transverse push electric fields can make the liquid crystal molecules 70 tend to incline towards the direction of the vertical electric field. Under the joint effects of the transverse pull electric field, the transverse push electric fields and the vertical electric field, the liquid crystal molecules 70 can respond quickly. In addition, it is not necessary to configure bumps on the color filter substrate 80 when a TFT array substrate with the above pixel structure is adopted, so a photo etching process is saved in the manufacture process of the color filter substrate 80, which can simplify the manufacture process, reduce the costs, and improve the contrast ratio of the LCD panel.

A LCD adopting the TFT array substrate of this embodiment may also adopt any of the connection manners of pixel structures shown in FIGS. 5(*a*) 5(*b*) and 5(*c*) to implement a dot inversion, and this will not be further described herein.

In a LCD adopting any of the TFT array substrates provided by the above embodiments, it is not necessary to configure bumps on the color filter substrate because in the pixel structure, common electric fields formed among the pull alignment electrode, the push alignment electrode, the pixel electrode and the common electrode act on the liquid crystal molecules. Therefore, a photo etching process is saved in the manufacture process of the color filter substrate, which can simplify the manufacture process, reduce the costs and improve the contrast ratio of the LCD panel.

The LCD of the present invention includes a LCD panel and a driving circuit connected with the LCD panel, wherein the LCD panel may include any of the TFT array substrates provided by the above embodiments.

The present invention is not limited to the above embodiments. For example, the pull alignment electrode in the above embodiments may be formed by the first metal layer, i.e., it can be formed on the same layer as the scanning lines; both the first pull alignment line and the second pull alignment line may be formed by the first metal layer, or both be formed by the second metal layer, or one of the first pull alignment line and the second pull alignment line is formed by the second metal layer or by additional separate wiring. The principle and implementations of the present invention are described in the above by referring to specific examples, and the description of the embodiments is merely for understanding the method and the core idea of the present invention. The skilled person in the art may modify the implementations and the application scope based on the idea of the present invention. In view of the foregoing, the contents of the specification should not be interpreted as the limitation of the present invention.

What is claimed is:

1. A Thin Film Transistor (TFT) array substrate, comprising: a plurality of scanning lines, a plurality of data lines and a plurality of pixel regions, wherein
   each pixel region is defined by an intersection of two adjacent scanning lines and two adjacent data lines, and comprises a pixel electrode, a first TFT for controlling the pixel electrode, a pull alignment electrode, a second TFT for controlling the pull alignment electrode, a first push alignment electrode and a second push alignment electrode;
   a projection of the pull alignment electrode on the TFT array substrate is located within the pixel electrode and is electrically insulated from the pixel electrode; and
   projections of the first push alignment electrode and the second push alignment electrode on the TFT array substrate are respectively located at two opposite sides of the pixel electrode,
   when a voltage is applied to the TFT array substrate, a transverse pull electric field is formed between the pull alignment electrode and the pixel electrode, and transverse push electric fields are formed respectively between the first push alignment electrode and the pixel electrode and between the second push alignment electrode and the pixel electrode.

2. The TFT array substrate of claim 1, further comprising a first pull alignment line and a second pull alignment line, wherein
   the first pull alignment line is connected with the pull alignment electrodes in pixel regions in odd lines and odd columns and in even lines and even columns via the second TFT, and the second pull alignment line is connected with the pull alignment electrodes in pixel regions in even lines and odd columns and in odd lines and even columns via the second TFT.

3. The TFT array substrate of claim 2, wherein the first pull alignment line and the second pull alignment line are approximately parallel to the scanning lines.

4. The TFT array substrate of claim 2, wherein the first push alignment electrode and the second push alignment electrode are formed by two extending parts of a common electrode line in the pixel region.

5. The TFT array substrate of claim 2, wherein the first push alignment electrode is formed by a data line electrically connected with a pixel electrode in a pixel region which is in the same line as and adjacent to the pixel region where the first push alignment electrode is located, and the second push alignment electrode is formed by an extending part of a common electrode line in the pixel region.

6. The TFT array substrate of claim 2, wherein the first push alignment electrode is formed by an extending part of a pixel electrode in a pixel region which is in the same line as and adjacent to the pixel region where the first push alignment electrode is located, and the second push alignment electrode is formed by a data line electrically connected with a pixel electrode in the other pixel region which is in the same line as and adjacent to the pixel region where the second push alignment electrode is located.

7. The TFT array substrate of claim 1, wherein the pull alignment electrode is in a strip shape, and the projection of the pull alignment electrode on the TFT array substrate is approximately located in a middle of the pixel electrode.

8. The TFT array substrate of claim 1, wherein the pull alignment electrode is on a same layer as the plurality of scanning lines, or the pull alignment electrode is on a same layer as the plurality of data lines.

9. The TFT array substrate of claim 1, wherein the pixel electrode has at least one slit hole in an overlapping area of the pixel electrode and the projection of the pull alignment electrode on the TFT array substrate.

10. The TFT array substrate of claim 1, wherein the pixel electrode is in a fishbone shape.

11. The TFT array substrate of claim 1, wherein the pixel electrode is in a V-shape or in a Z-shape.

12. The TFT array substrate of claim 1, wherein gate electrodes of the first TFT and the second TFT in the same pixel region are electrically connected with the same scanning line or with different scanning lines.

13. A liquid crystal display (LCD), comprising a LCD panel and a driving circuit connected with the LCD panel, wherein the LCD panel comprises a Thin Film Transistor (TFT) array substrate, a color filter substrate having a common electrode and a liquid crystal layer between the TFT array substrate and the color filter substrate, the TFT array substrate comprising a plurality of scanning lines, a plurality of data lines and a plurality of pixel regions, wherein each pixel region is defined by intersection of two adjacent scanning lines and two adjacent data lines, and comprises a pixel electrode, a first TFT for controlling the pixel electrode, a pull alignment electrode, a second TFT for controlling the pull alignment electrode, a first push alignment electrode and a second push alignment electrode;

a projection of the pull alignment electrode on the TFT array substrate is located within the pixel electrode and is electrically insulated with the pixel electrode; and projections of the first push alignment electrode and the second push alignment electrode on the TFT array substrate are respectively located on two opposite sides of the pixel electrode, when a voltage is applied to the TFT array substrate, a transverse pull electric field is formed between the pull alignment electrode and the pixel electrode, and transverse push electric fields are formed respectively between the first push alignment electrode and the pixel electrode and between the second push alignment electrode and the pixel electrode.

14. The LCD of claim 13, wherein the TFT array substrate further comprising a first pull alignment line and a second pull alignment line, wherein the first pull alignment line is connected with the pull alignment electrodes in pixel regions in odd lines and odd columns and in even lines and even columns via the second TFT, and the second pull alignment line is connected with the pull alignment electrodes in pixel regions in even lines and odd columns and in odd lines and even columns via the second TFT.

15. The LCD of claim 14, wherein the first push alignment electrode and the second push alignment electrode are formed by two extending parts of a common electrode line in the pixel region.

16. The LCD of claim 13, wherein the LCD panel adopts a column inversion driving manner, in the same frame, pixel electrodes in pixel regions in odd lines and odd columns and in even lines and even columns have different polarities from pixel electrodes in pixel regions in odd lines and even columns and in even lines and odd columns.

17. The LCD of claim 13, wherein the pull alignment electrode has the same polarity as a pixel electrode in the pixel region where the pull alignment electrode is located, but there is a voltage difference therebetween.

18. The LCD of claim 17, wherein a voltage difference between the pull alignment electrode and the common electrode is larger than a voltage difference between the pixel electrode and the common electrode.

19. The LCD of claim 13, wherein polarities of voltages applied to the first pull alignment line and the second pull alignment line in the same frame are opposite, and both the first pull alignment line and the second pull alignment line adopt a frame inversion driving manner.

20. The LCD of claim 13, wherein in the same pixel region, voltage differences between the first push alignment electrode and the pixel electrode and between the second push alignment electrode and the pixel electrode are not lower than a voltage difference between the pixel electrode and the common electrode.

* * * * *